US012784752B2

(12) United States Patent
Schroeder

(10) Patent No.: US 12,784,752 B2
(45) Date of Patent: Nov. 3, 2026

(54) CONVERSATIONAL CONTROL OF AN APPLIANCE

(71) Applicant: Haier US Appliance Solutions, Inc., Wilmington, DE (US)

(72) Inventor: Michael Goodman Schroeder, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 111 days.

(21) Appl. No.: 18/790,890

(22) Filed: Jul. 31, 2024

(65) Prior Publication Data

US 2026/0038497 A1 Feb. 5, 2026

(51) Int. Cl.
*G10L 15/22* (2006.01)
*F25D 29/00* (2006.01)

(52) U.S. Cl.
CPC .............. *G10L 15/22* (2013.01); *F25D 29/00* (2013.01); *F25D 2700/00* (2013.01)

(58) Field of Classification Search
CPC ....... G10L 15/22; F25D 29/00; F25D 2700/00
See application file for complete search history.

(56) References Cited

U.S. PATENT DOCUMENTS 6,988,070 B2 * 1/2006 Kawasaki ............... G10L 15/26 704/E15.045
7,657,433 B1 * 2/2010 Chang ..................... G10L 15/08 704/252
11,657,832 B2 5/2023 Sundaram et al.
11,664,027 B2 * 5/2023 Subhojit ............... G10L 15/065 704/275
11,704,745 B2 7/2023 Poddar et al.
11,735,178 B1 8/2023 Mara
11,749,277 B2 * 9/2023 Ahn ......................... H04Q 9/00 704/275
11,935,526 B2 * 3/2024 Bromand ................ G10L 15/26
12,142,272 B2 * 11/2024 Zheng ...................... G10L 15/22
12,387,716 B2 * 8/2025 Coucke ................... G10L 15/16
12,424,203 B2 * 9/2025 Han ......................... G10L 15/08
2009/0326957 A1 * 12/2009 Yang ....................... G10L 15/26 715/728
2011/0210822 A1 * 9/2011 Lee ......................... F25D 29/00 704/E15.005
2014/0188463 A1 * 7/2014 Noh ......................... G10L 15/00 704/201

(Continued)

FOREIGN PATENT DOCUMENTS

CN 110335600 A 10/2019
CN 212006359 U 11/2020

(Continued)

*Primary Examiner* — Nelson J Nieves
(74) *Attorney, Agent, or Firm* — Dority & Manning, P.A.

(57) ABSTRACT

A method of operating an appliance includes obtaining a sound signal using a microphone of the appliance, analyzing the sound signal to identify a voice input including a request for a responsive action, determining an action confidence metric regarding performance of the responsive action, determining that the action confidence metric exceeds a predetermined action threshold, determining that the responsive action to the voice input is needed based on the action confidence metric exceeding the predetermined action threshold, and performing the responsive action.

19 Claims, 4 Drawing Sheets

(56) References Cited

U.S. PATENT DOCUMENTS

| | | | | |
|---|---|---|---|---|
| 2015/0120294 | A1* | 4/2015 | Gardner | G10L 15/26<br>704/235 |
| 2016/0077794 | A1* | 3/2016 | Kim | G10L 15/20<br>704/275 |
| 2019/0066680 | A1* | 2/2019 | Woo | G10L 15/22 |
| 2021/0103811 | A1 | 4/2021 | Kim | |
| 2021/0210073 | A1* | 7/2021 | Shin | F25D 29/00 |
| 2021/0254884 | A1* | 8/2021 | Hong | F25D 23/028 |
| 2021/0278124 | A1* | 9/2021 | Lim | G06Q 10/0875 |
| 2021/0372694 | A1* | 12/2021 | Li | G06F 3/0481 |
| 2024/0069861 | A1* | 2/2024 | Lee | F25D 29/00 |
| 2024/0071390 | A1 | 2/2024 | Kim et al. | |

FOREIGN PATENT DOCUMENTS

| | | | |
|---|---|---|---|
| CN | 114108228 | A | 3/2022 |
| WO | WO2023038654 | A1 | 3/2023 |

* cited by examiner

CONVERSATIONAL CONTROL OF AN APPLIANCE

FIELD OF THE INVENTION

The present subject matter relates generally to appliances, and more particularly to methods of operating an appliance by detecting user interactions and implementing conversational control.

BACKGROUND OF THE INVENTION

Conventional appliances include user interface panels where a user may interact with the appliance. For example, refrigerator appliances include user interface panels where a user can adjust operating parameters, provide commands, update inventory lists, or otherwise interact with the appliance. However, in certain situations, a user may not wish to interact with these user interface panels directly, e.g., when they are not directly in front of the appliance, when their hands are occupied, when they are busy with other tasks, etc.

Certain conventional appliances utilize "wake words," i.e., words that are detected by the appliance and that initiate a process of listening for commands or requests. These wake words are often clunky, require user training and behavior changes, and do not follow typical conversational interactions. Accordingly, appliances often respond erratically, e.g., by providing a response or initiating a task when the user did not intend to take such action, or vice versa. This inability to naturally communicate and control an appliance may lead to user frustration, performance of unintended tasks, failure to perform intended tasks, etc.

Accordingly, a method of operating an appliance using more natural human interactions is desired. More specifically, a method for operating an appliance that permits conversational control and user interaction that is simplified and generates a more consistent and accurate response would be particularly beneficial.

BRIEF DESCRIPTION OF THE INVENTION

Aspects and advantages of the invention will be set forth in part in the following description, may be apparent from the description, or may be learned through practice of the invention.

In one exemplary embodiment, a method of operating an appliance including a microphone is provided, including obtaining a sound signal using the microphone, analyzing the sound signal to identify a voice input including a request for a responsive action, determining an action confidence metric regarding performance of the responsive action, determining that the action confidence metric exceeds a predetermined action threshold, determining that the responsive action to the voice input is needed based on the action confidence metric exceeding the predetermined action threshold, and performing the responsive action.

In another exemplary embodiment, an appliance is provided including a cabinet, a microphone mounted to the cabinet, and a controller in operative communication with the microphone. The controller being configured to obtain a sound signal using the microphone, analyze the sound signal to identify a voice input including a request for a responsive action, determine an action confidence metric regarding performance of the responsive action, determine that the action confidence metric exceeds a predetermined action threshold, determine that the responsive action to the voice input is needed based on the action confidence metric exceeding the predetermined action threshold, and perform the responsive action.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
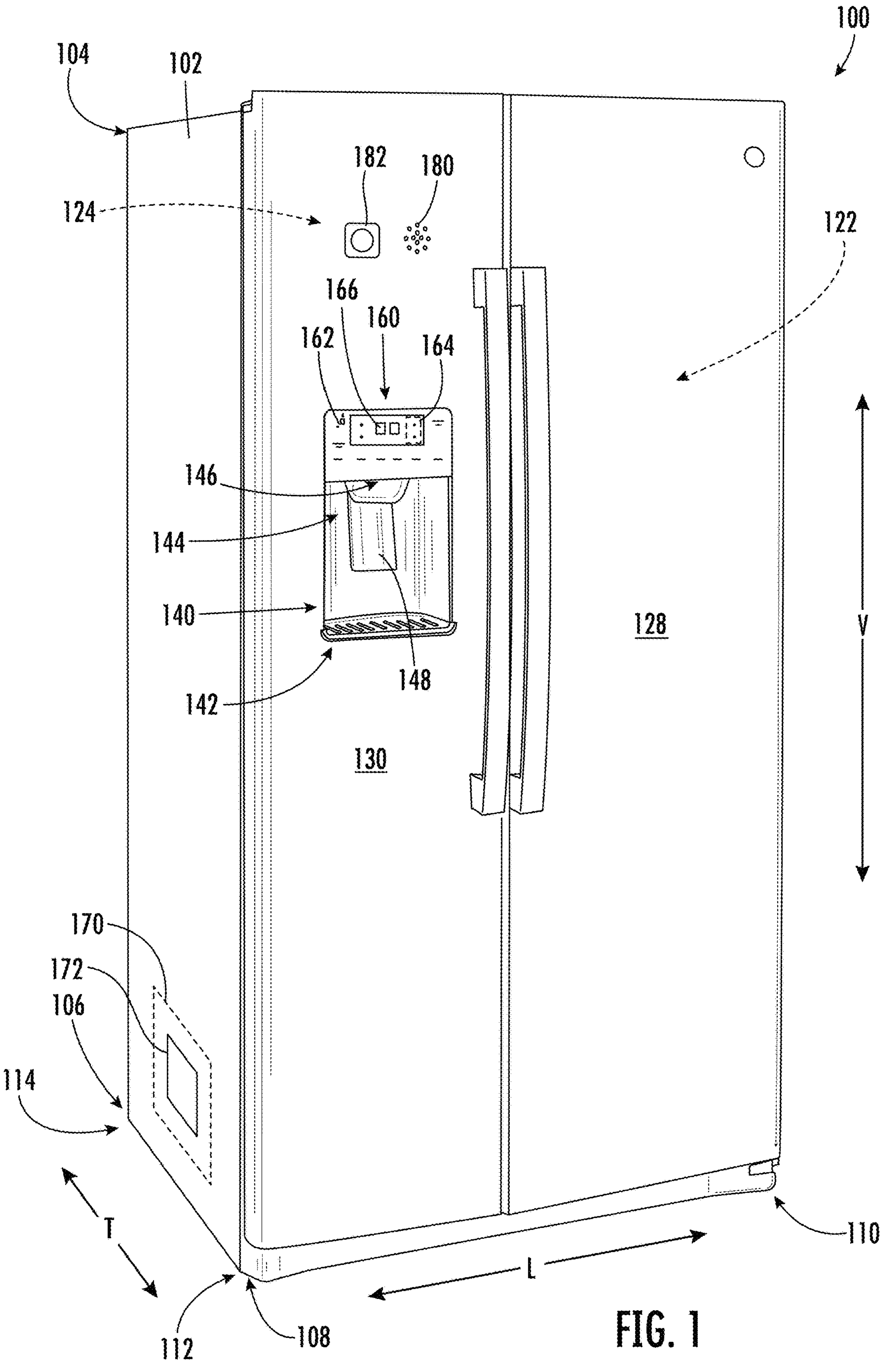
FIG. 1 provides a perspective view of a refrigerator appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As explained herein, aspects of the present subject matter are generally directed to an appliance (e.g., such as a refrigerator) that utilizes an artificial intelligence (AI) based voice control that initiates conversation without the need for explicit wake words. The appliance is always listening (similar to a wake-word engine), but whenever a sound is heard that exceeds an amplitude threshold (sound level), it may begin recording. When the sound level drops below the threshold for a period (e.g., 1 second), the recording may be sent to a voice-to-text (VTT) algorithm. As an optional prefilter, the audio data can be run through a small model to determine if a human voice is present, or it is simply a random sound (natural or mechanical). Text data may then be passed through a series of checks to determine if a response should be generated by the appliance. Time stamps may be checked because an active conversation often warrants a response (e.g., active conversation may be maintained for 15 seconds since the last voice interaction). Key words/phrases may be looked for that relate to known appliance features such as autofill, precise fill, temperature, etc., indicating that a response is likely warranted. Some key phrases might be relevant only if there is an active conversation, such as "thank you." Finally, if it still isn't sure whether to respond, the text may be passed to a large language model (LLM) to determine if the user would expect a response from the appliance (e.g., the refrigerator). It may assess the text based on known features and recent interactions data and parses the result to determine if a response is likely expected.

If a response is determined to be necessary, the method may pass the text to a separate LLM instance to determine if any of the supported appliance functions are being invoked. These functions may include temperature settings changes/queries, shopping list manipulation/query, inventory information, dispenser operations, unit conversions or other cooking related questions, or general information. For built-in functions, it may respond with a "canned" response or allow the LLM to respond, telling it what function was invoked along with the chat history to generate a response. The response may be parsed and it either invokes functions or sends another call to an LLM to answer the question or respond in the expected fashion. Finally, it may generate text to voice data (TTS) to respond verbally and/or visually on the display. A long response may be put on the display while the voice response directs the user to read it there or on their device.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent second side 110 of housing 102 and a freezer chamber 124 arranged at or adjacent first side 108 of housing 102. As such, refrigerator appliance 100 is generally referred to as a side-by-side refrigerator. It is recognized, however, that the benefits of the present disclosure apply to other types and styles of refrigerator appliances such as, e.g., a top mount refrigerator appliance, a bottom mount refrigerator appliance, or a single door refrigerator appliance. Consequently, the description set forth herein is for illustrative purposes only and is not intended to be limiting in any aspect to any particular refrigerator chamber configuration.

A refrigerator door 128 is rotatably hinged to an edge of housing 102 for selectively accessing fresh food chamber 122. In addition, a freezer door 130 is rotatably hinged to an edge of housing 102 for selectively accessing freezer chamber 124. Refrigerator door 128 and freezer door 130 are shown in the closed configuration in FIG. 1. One skilled in the art will appreciate that other chamber and door configurations are possible and within the scope of the present invention.

Figure 2:
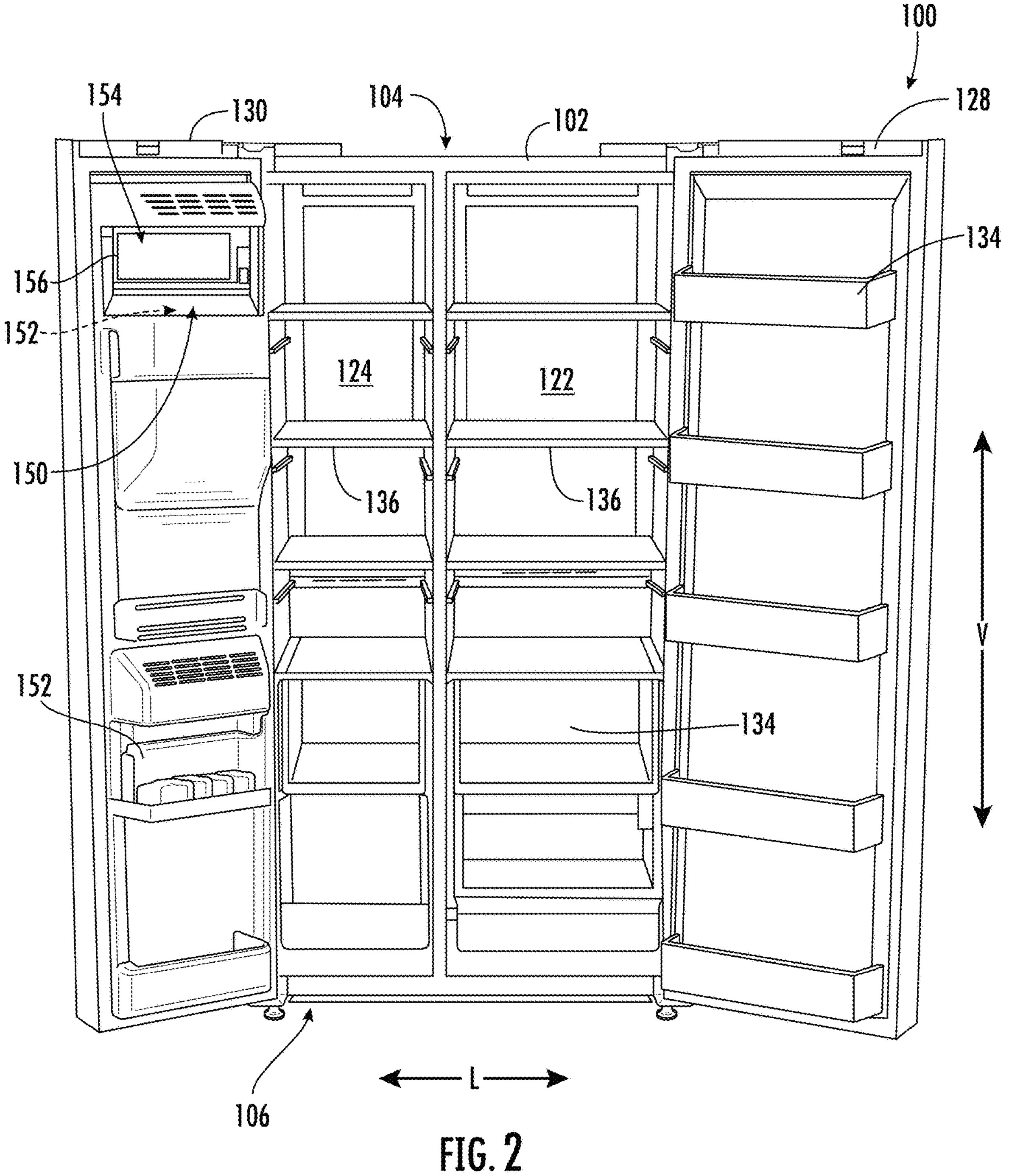
FIG. 2 provides a front view of the example refrigerator appliance of FIG. 1, with the doors of the fresh food chamber and freezer chamber shown in an open position.

FIG. 2 provides a front view of refrigerator appliance 100 shown with refrigerator door 128 and freezer door 130 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator door 128 and freezer door 130 or may slide into a receiving space in fresh food chamber 122 or freezer chamber 124. It should be appreciated that the illustrated storage components are used only for the purpose of explanation and that other storage components may be used and may have different sizes, shapes, and configurations.

Referring now generally to FIG. 1, a dispensing assembly 140 will be described according to exemplary embodiments of the present subject matter. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on freezer door 130. In this regard, dispenser recess 142 is defined on a front side 112 of refrigerator appliance 100 such that a user may operate dispensing assembly 140 without opening freezer door 130. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142.

Referring again to FIG. 2, inside refrigerator appliance 100, freezer door 130 may include an ice dispensing system 150 that generally includes one or more icemakers and ice storage bins 152 that are configured to form ice. In this regard, for example, ice dispensing system 150 may define an ice making chamber 154 for housing ice making assemblies, storage mechanisms, and dispensing mechanisms. According to the illustrated embodiment, ice dispensing system 150 may include dispensing assembly 140 and may have a main icemaker 156. In addition, ice dispensing system 150 may include an icemaker for forming "craft ice" that is commonly large, clear cubes or spheres of ice for alcoholic or non-alcoholic drinks. For example, a user may access this craft ice by opening freezer door 130 and accessing storage bin 152 directly.

A control panel 160 is provided for controlling the mode of operation. For example, control panel 160 includes one or more selector inputs 162, such as knobs, buttons, touchscreen interfaces, etc., such as a water dispensing button and an ice-dispensing button, for selecting a desired mode of operation such as crushed or non-crushed ice. In addition, inputs 162 may be used to specify a fill volume or method of operating dispensing assembly 140. In this regard, inputs 162 may be in communication with a processing device or controller 164. Signals generated in controller 164 operate refrigerator appliance 100 and dispensing assembly 140 in response to selector inputs 162. Additionally, a display 166, such as an indicator light or a screen, may be provided on control panel 160. Display 166 may be in communication with controller 164 and may display information in response to signals from controller 164.

As used herein, "processing device" or "controller" may refer to one or more microprocessors or semiconductor devices and is not restricted necessarily to a single element. The processing device can be programmed to operate refrigerator appliance 100 and dispensing assembly 140. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring again briefly to FIG. 1, according to an exemplary embodiment, cabinet 102 also defines a mechanical compartment 170 at or near the bottom 106 of the cabinet 102 for receipt of a hermetically sealed cooling system 172. In general, sealed cooling system 172 is configured for transporting heat from the inside of refrigerator appliance 100 to the outside (e.g., by executing a vapor-compression cycle or another suitable refrigeration cycle). As is generally understood by those of skill in the art, the hermetically sealed system 172 contains a working fluid, e.g., refrigerant, which flows between various heat exchangers of the sealed system 172 where the working fluid changes phases while transferring thermal energy.

In this regard, as understood by one having ordinary skill in the art, sealed system 172 may include a compressor, a condenser, an expansion device, and one or more evaporators connected in series by a fluid conduit that is charged with a refrigerant. Within sealed system 172, refrigerant flows into the compressor, which operates to increase the pressure of the refrigerant. This compression of the refrigerant raises its temperature, which is lowered by passing the refrigerant through the condenser. Within the condenser, heat exchange with ambient air takes place so as to cool the refrigerant. A condenser fan may be used to pull air across the condenser, so as to provide forced convection for a more rapid and efficient heat exchange between the refrigerant within the condenser and the ambient air. Thus, as will be understood by those skilled in the art, increasing air flow across the condenser can, e.g., increase the efficiency of the condenser by improving cooling of the refrigerant contained therein.

An expansion device (e.g., an electronic expansion valve, capillary tube, or other restriction device) receives refrigerant from the condenser. From the expansion device, the refrigerant enters the evaporator. Upon exiting the expansion device and entering the evaporator, the refrigerant drops in pressure. Due to the pressure drop and/or phase change of the refrigerant, the evaporator is relatively cool. An evaporator fan is typically provided at each the evaporator, e.g., to force air across and around the at least one evaporator to transfer thermal energy from the air to the evaporator (and more particularly, to the working fluid or refrigerant therein).

In this manner, a flow of cooling air exits the evaporator and may be distributed to one or more of the chilled chambers 122 and/or 124. Specifically, one or more ducts may extend between the mechanical compartment 170 and the chilled chambers 122 and/or 124 to provide fluid communication therebetween, e.g., to provide the chilled air from the hermetically sealed cooling system 172, e.g., from an evaporator thereof, to one or more of the chilled chambers 122 and/or 124.

The sealed system 172 described herein is provided by way of example only. Thus, it is within the scope of the present subject matter for other configurations of the refrigeration system to be used as well. For example, according to alternative embodiments, sealed system 172 may include additional components, e.g., at least one additional evaporator, compressor, expansion device, and/or condenser. For example, refrigerator appliance 100 may have two or more split evaporators, e.g., one dedicated primarily to cooling fresh food chamber 122 and one dedicated primarily to cooling freezer chamber 124. In addition, alternative plumbing configurations, valves, and flow regulators may be used to route refrigerant throughout sealed system 172.

As illustrated in FIG. 1, refrigerator appliance 100 may further include one or more microphones 180 that are generally positioned and configured for monitoring sound around refrigerator appliance 100, e.g., within the room containing refrigerator appliance 100. For example, according to the illustrated embodiment, a single microphone 180 is mounted to refrigerator door 128 of refrigerator appliance 100. Microphone 180 is generally configured for monitoring sound, voice inputs from the user of refrigerator appliance 100, etc. As used herein, the terms microphone and the like are generally intended to refer to any suitable audio input, such as a microphone, an acoustic pickup, sound receiver/transmitter, or any of sound receiving device.

In addition, it should be appreciated that any suitable number, type, position, and configuration of microphones may be used while remaining within the scope of the present subject matter. For example, according to the illustrated embodiment, a single microphone 180 is mounted to refrigerator door 128 for monitoring sounds and voices around refrigerator appliance 100 (e.g., within the kitchen, dining room, etc.). As described herein, detected sounds and voices may be used to improve user interaction and control of refrigerator appliance 100. However, according to alternative embodiments, microphone 180 could be mounted to any other kitchen appliance or could be a standalone device that is in operative communication with refrigerator appliance 100 to provide feedback regarding a user interaction with refrigerator appliance 100.

As shown for example in FIG. 1, refrigerator appliance 100 may include a camera 182 that is generally positioned and configured for obtaining images of the environment surrounding refrigerator appliance 100 during operation. Specifically, according to the illustrated embodiment, a single camera 182 may be mounted to refrigerator door 128 or at any other suitable positioned for obtaining images in or around refrigerator appliance 100. Although a single camera 182 is illustrated, it should be appreciated that refrigerator appliance 100 may include any suitable number of cameras positioned at any suitable location and orientation for obtaining useful images related to user interaction with refrigerator appliance 100. In addition, it should be appreciated that each camera 182 may include features for adjusting the field-of-view and/or orientation.

It should be appreciated that the images obtained by camera 182 may vary in number, frequency, angle, resolution, detail, etc. in order to improve the clarity of the particular regions surrounding or within refrigerator appliance 100. In addition, according to exemplary embodiments, controller 164 (or any other suitable dedicated controller) may be communicatively coupled to camera 182 and may be programmed or configured for analyzing the images obtained by camera 182, e.g., in order to detect and analyze user interactions with refrigerator appliance. Moreover, it should be appreciated that controller 164 may be in operative communication with a remote server (e.g., via a network) for offloading images for remote analysis. Such analysis may be intended to detect user interactions with refrigerator appliance 100, e.g., as described in more detail below.

Now that the construction and configuration of refrigerator appliance 100 has been presented according to an exemplary embodiment of the present subject matter, an exemplary method 200 for operating a refrigerator appliance 100 is provided. Method 200 can be used to operate refrigerator appliance 100, or to operate any other suitable refrigerator. In this regard, for example, controller 164 may be configured for implementing method 200. However, it should be appreciated that the exemplary method 200 is discussed herein only to describe exemplary aspects of the present subject matter, and is not intended to be limiting.

Figure 3:
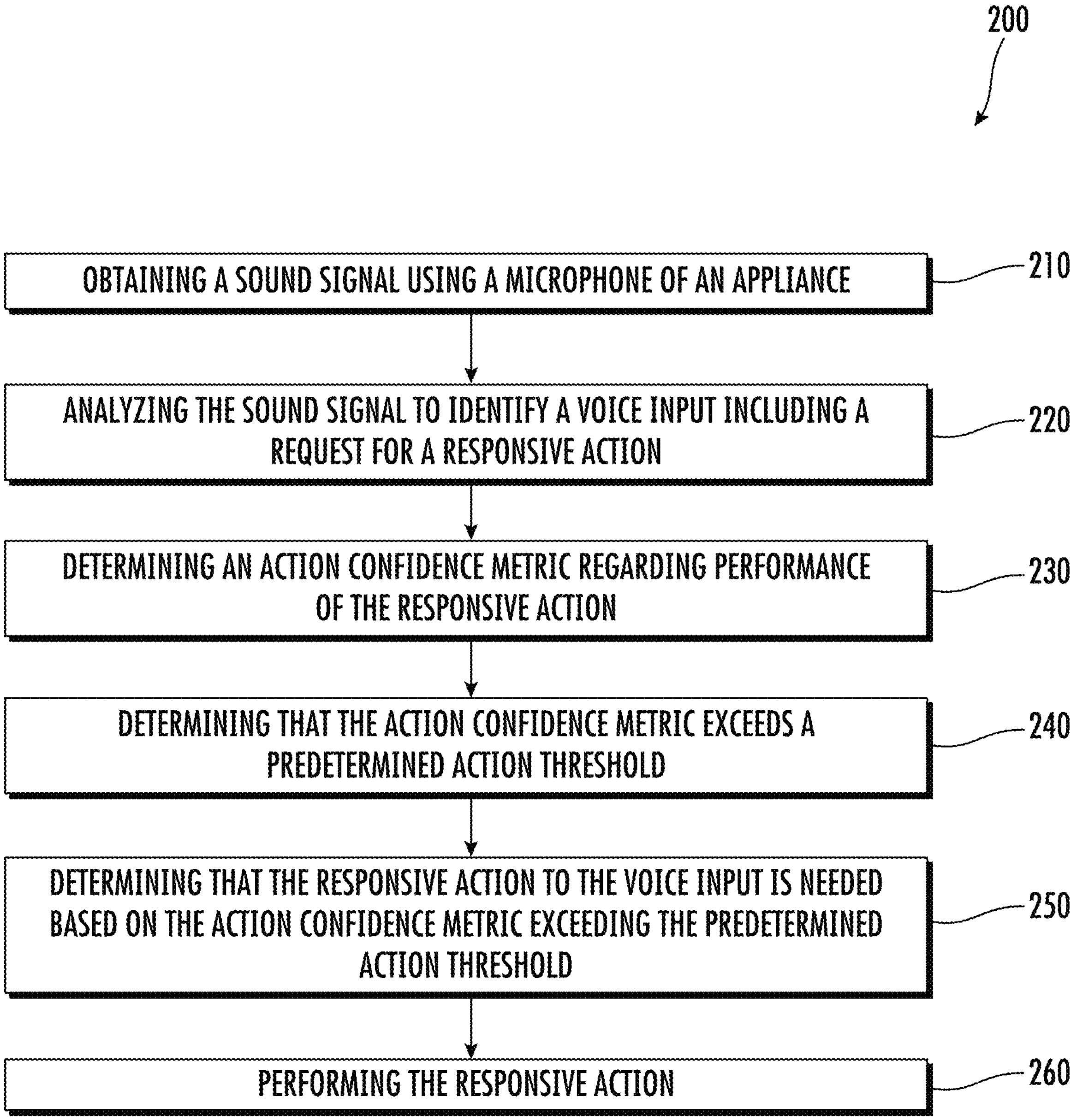
FIG. 3 provides a method for operating an appliance according to an example embodiment of the present subject matter.

As shown in FIG. 3, method 200 includes, at step 210, obtaining a sound signal using a microphone of an appliance. In this regard, continuing the example above, microphone 180 of refrigerator appliance 100 may monitor sounds generated within an area surrounding refrigerator appliance 100. As explained briefly above, monitoring sound in this manner may facilitate voice interaction and control of refrigerator appliance 100. However, conventional means for monitoring, parsing, and analyzing the sound for appliance control are bulky and inaccurate. For example, appliances frequently respond in situations where no response is needed, or by contrast, fail to respond when a user is trying to interact with the appliance. Accordingly, the methods described herein may be used to facilitate improved interaction and control of any suitable appliance.

Step 220 may generally include analyzing the sound signal to identify a voice input including a request for a responsive action. In this manner, the voice input may be from a user of refrigerator appliance 100 requesting that refrigerator appliance 100 perform some specific action or provide some specific information to the user. In general, the analysis performed at step 220 and/or at other steps of the various methods described herein may include the use of machine learning or artificial intelligence algorithms. It should be appreciated that the terms "sound signal" and the like may be used herein to refer to any suitable sound recording, audio stream, or any other information or data recorded by microphone 180 of refrigerator appliance 100.

According to example embodiments, the initiation and duration of a sound recording or of obtaining a sound signal may occur in any suitable manner. For example, according to an example embodiment, controller 164 may be configured to determine that the sound signal exceeds a predetermined sound level and commence a recording of the sound signal when that sound level is exceeded. The sound signal may continue to be recorded until the controller determines that the sound signal drops below the predetermined sound level for a predetermined amount of time, e.g., indicating that the user has stated the command and finished their communication. At this point, controller 164 may stop the recording of the sound signal and may analyze the recording to identify the voice input.

It should be appreciated that the analysis of the sound signature or audio stream may include the use of any suitable speech recognition algorithms, speech-to-text programs, or other methods to convert the sound signature into a text stream or a listing of words. In addition, step 220 may include any suitable any suitable sound analysis, decomposition, or recognition software or algorithm. In this regard, as would be appreciated by one of ordinary skill in the art, the voice input may be broken down into a plurality of tokens, e.g., such as a timestamp associated with each word in a text string, a location of the text relative to other words within the voice input, etc. In addition, the various words detected within the voice input may be broken into word types such as keywords, qualitative or quantitative indicators, or other categories.

According to such an embodiment, the text stream may then be analyzed to extract useful user feedback or other information related to the operation of refrigerator appliance or the control thereof. In addition, the analysis performed (either on the sound signature or converted textual data) may include the use of any suitable machine learning algorithm, neural network analysis, deep learning, or other artificial intelligence methods. In addition, the analysis may utilize any other suitable sound processing and recognition techniques while remaining within the scope of the present subject matter.

In addition, it should be appreciated that some or all of the sound processing, voice detection, speech recognition, and feedback analysis may be performed locally, remotely, or in any other distributed manner. In this regard, for example, controller 164 may include a sound processing module (not shown) that is operably coupled with microphone 180 and is programmed for receiving sound signals and analyzing those signals to identify keywords, word associations, and other user feedback. Controller 164 may further include a database (or may perform sound training to populate a database) with potential sounds or voice inputs for comparing with detected sound. Notably, controller 164 may further be configured for learning sounds, word associations, or other voice input associated with user feedback for use in adjusting appliance operation. For example, common user voice inputs or operating noises may be intentionally generated to train a neural network model. That model may then be used to detect particular voice inputs associated with user feedback. Such voice inputs may be stored locally on controller 164 or a remote server.

In this manner, controller 164 may associate a given voice input with user feedback that may be used to adjust and/or improve appliance operation. In addition, or alternatively, controller 164 may include a wireless communication module (not shown) for communicating with a remote server, a remote device, etc. In this manner, controller 164 may be configured for communicating detected sound to an external sound processing device, e.g., via the wireless communication module and a network. This external sound processing device, which may be stored on a remote server and may be configured for analyzing the sound signal to identify the user feedback.

In addition, it should be appreciated that the sound signal and/or sound signature may be converted into any suitable form, may be compressed, may be transmitted, and may otherwise be manipulated in any suitable manner to improve analysis. Moreover, the sound processing module may transmit some or all of the sound signal to an external processing device. In this regard, the sound processing module makes it easier or less data intensive to transmit and analyze sound signals. Thus, for example, the sound processing module may transmit the sound signal (e.g., or the compressed sound signal) to a remote server for analysis. The sound processing module may further be configured for receiving analytic feedback from the remote server. In this manner, data processing may be offloaded from controller 164.

In addition, according to an example embodiment, the sound signal analysis may include a separate model for analyzing the recording to determine that a human voice is present in the recording, e.g., as opposed to another random sound, such as the operation of another appliance, mechanical sounds, etc. Controller 164 may further be configured to generate a textual record of the recording using a speech to text algorithm and analyzing the textual record to determine if a responsive action is needed from the appliance, e.g., whether the user is directing the appliance to perform a function or provide the user with feedback regarding inventory, recipes, etc. As explained above, the analysis of the textual record, the sound signal, or the voice input may include the use of artificial intelligence or machine learning algorithms.

Method 200 may also include steps for determining that the responsive action to the voice input is needed based on a variety of factors. Although exemplary factors for determining that the responsive action is needed are described herein, it should be appreciated that variations and modifications to the algorithms, the factor weightings, etc. may be varied while remaining within the scope of the present subject matter. The various methods described herein are only exemplary, may include interchangeable steps to generate still additional algorithms that are considered to be within the scope of the present subject matter.

For example, step 230 may include determining an action confidence metric regarding performance of the responsive action. In this regard, that action confidence metric may be a value, e.g., from 0 to 100%, that correlates to the likelihood that the user intended for a refrigerator appliance 100 to take action in response to user input. For example, vague or uncommon requests may typically have a low action confidence metric, whereas refrigerator requests (e.g., such as prompts related to inventory management, dispenser control, etc.) that are commonly received and performed by refrigerator appliance 100 may include a higher action confidence metric. In addition, the action confidence metric may be modified based on a combination of voice inputs, user interactions, external conditions, or other indicators that may indicate an increased or decreased likelihood that a user is interacting with refrigerator appliance 100.

According to an example embodiment, step 230 may include determining that the action confidence metric exceeds a predetermined action threshold. In this regard, the predetermined action threshold may be a value that is set by the manufacturer, programmed by the user, determined by controller 164, or set in any other suitable manner as a threshold beyond which refrigerator appliance 100 will take action in response to the sound signal. For example, if the action confidence threshold is set at 80%, any voice inputs that have an action confidence metric above 80% may result in appliance action, whereas any voice inputs that have an action confidence metric below 80% may result in inaction from refrigerator appliance 100.

For example, step 250 may include determining that the responsive action to the voice input is needed based on the action confidence metric exceeding the predetermined action threshold. When this occurs, step 260 may include performing the responsive action. For example, using the example of refrigerator appliance 100, the responsive action may include at least one of performing an appliance function, providing an informative response to a user, or prompting the user for further information or clarification. Common appliance functions that may be performed may include is at least one of temperature setting changes/queries, shopping list manipulation/queries, inventory information/queries, dispenser operations, unit conversions, or other cooking related questions.

As explained above, if the action confidence metric exceeds the predetermined action threshold, refrigerator 100 may take responsive action to the voice input. By contrast, method 200 may include determining that the action confidence metric falls below the predetermined action threshold. In such case, method 200 may include determining that responsive actions to the voice input is not needed based on the action confidence metric falling below the predetermined action threshold, such that refrigerator appliance may take no action.

As explained briefly above, various factors may affect whether method 200 results in a determination that responsive action is needed. More specifically, according to the example embodiment, these various factors may affect the action confidence metric, with certain factors having stronger weightings and/or the tendency to increase or decrease the action confidence metric. For example, one of the strongest indicators that a user is attempting to interact with refrigerator appliance 100 may be when the voice input includes a "wake word" for the appliance. In this regard, the "wake word" may be a predetermined word or phrase that is intended to initiate appliance action. Accordingly, the voice input includes the wake word, method 200 may include increasing the action confidence metric, e.g., or maxing the action confidence metric out at 100%.

Similarly, if the voice input contains a request to perform a common appliance function, this may indicate that a user is intending to interact with refrigerator appliance 100. For example, if the user is requesting a chamber temperature change, is asking to add something to inventory or a shopping list, is requesting that the dispenser provide ice or water, etc., this may result in an increase in the action confidence metric. It should be appreciated that the degree of increase may vary depending on how common the requested function is, how often the user makes the request, or a variety of other factors.

According to still other embodiments, and as described in more detail below with respect to FIG. 4, the action confidence metric may be increased or maxed out if it is determined that refrigerator appliance 100 is operating in a "conversational state of operation." As will be explained in more detail below, the conversational state of operation may be distinguished from a standard mode of operation in that a user is currently and actively engaging with refrigerator appliance 100 when the request is made. Because there is an active conversation with refrigerator appliance 100 when the request is made, the likelihood that the user intends for the refrigerator appliance 100 to implement the responsive action is increased, such that the action confidence metric may also be increased. Notably, the conversational state of operation may be time-limited, e.g., it may be assumed that a user is only interacting with refrigerator appliance 100 for a predetermined amount of time, after which the conversational state of operation ends and the normal state of operation commences. For example, method 200 may include exiting the conversational state of operation after a predetermined amount of time (e.g., such as 5 seconds, 10 seconds, 30 seconds, or 1 minute) has passed.

According to example embodiments, if a vague request is made, refrigerator appliance 100 may seek clarification from a user of the appliance. For example, if the action confidence metric falls within a particular confidence range, instead of performing an action or staying inactive, controller 164 may seek clarification from the user, e.g., using control panel 160, microphone 180, etc. In addition, method 200 may include providing a user notification regarding the performance of the responsive action, e.g., by communicating via microphone, transmitting a message to the user's mobile device, displaying a message on display 166, etc.

According to an example embodiment, providing this user notification may include converting a textual response (e.g., generated by a controller 164) into a verbal response using a text-to-speech algorithm which may then result in an audible verbal response generated by microphone 180. Other suitable manners of providing user notifications are possible and within the scope of the present subject matter.

Figure 4:
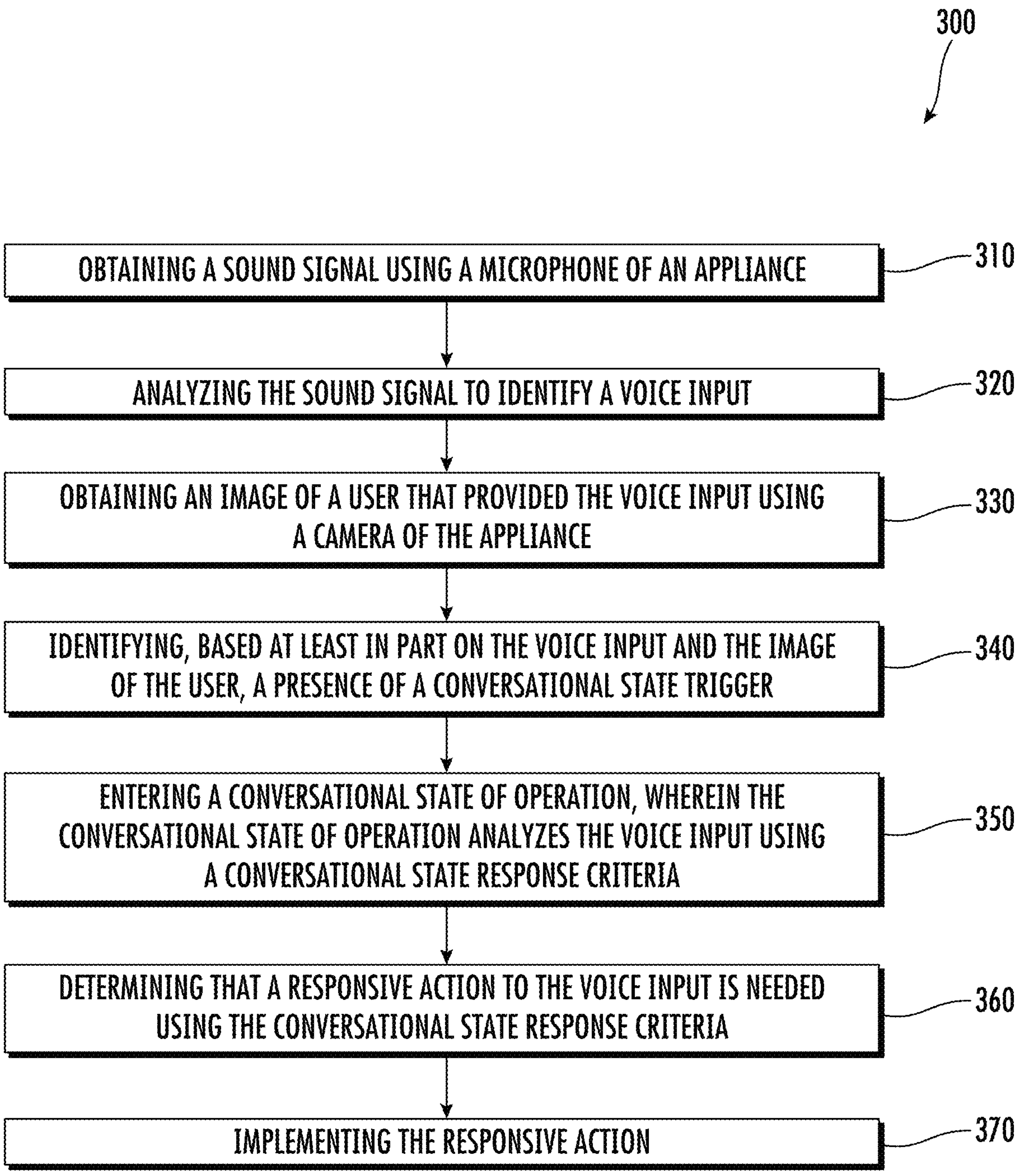
FIG. 4 provides a method for operating an appliance according to an example embodiment of the present subject matter.

Referring now to FIG. 4, a method 300 of providing user interactive control of an appliance according to an alternative example embodiment will be described. It should be appreciated that method 200 and method 300 may include many of the same or similar steps or processes, and redundant explanation may be omitted or limited for brevity. In general, method 300 may include the use of a camera to improve the identification of user interactions and to prevent taking action when not intended by the user.

As shown in FIG. 4, method 300 includes, at step 310, obtaining a sound signal using a microphone. In this regard, continuing the example above, microphone 180 of refrigerator appliance 100 may be used to obtain a sound signal and/or voice input from a user of refrigerator appliance 100. Step 320 may generally include analyzing the sound signal to identify a voice input. In this regard, as explained above, this sound signal may be analyzed using any suitable speech recognition technology and or machine learning algorithms to identify the presence of a human voice. In addition, a speech to text algorithm may be used to convert the sound signal into a textual response prior to such analysis.

Step 330 may generally include obtaining an image of a user that provided the voice input using a camera of the appliance. In this regard, continuing the example from above, refrigerator appliance 100 may use camera 182 to obtain one or more pictures, a video stream, or any other suitable visual representation of the user of refrigerator appliance 100. As explained in more detail below, this image or video may be used to improve the confidence that a user is intending to interact with refrigerator appliance 100 and that a responsive action should be initiated. By contrast, this image or video may be used to indicate that user interaction was not intended, such that appliance may remain inactive.

Step 340 may generally include identifying, based at least in part on the voice input and the image of the user, a presence of a conversational state trigger. In this regard, controller 164 may generally be programmed to operate in two different states of operation, referred to herein as the "standard state of operation" and the "conversational state of operation." In this regard, when operating under the normal or standard state of operation, refrigerator appliance 100 is generally less likely to take responsive action and requires a more strict or stringent set of criteria before doing so. By contrast, when operating under the conversational state of operation, refrigerator appliance 100 is generally more likely to take responsive action and requires a less stringent set of criteria (e.g., referred to herein as the "conversational state response criteria") before taking action. In this regard, the conversational state of operation may be entered when one or more indicators tend to show that a user is either actually interacting with refrigerator appliance 100 or has recently interacted with refrigerator appliance 100.

For example, identifying the presence of the conversational state trigger may include determining that the voice input contains the wake word for the appliance. In addition, or alternatively, identifying the presence of the conversational state trigger may include determining that the voice input contains a request to perform a common appliance function. For example, common appliance functions may include at least one of temperature setting changes/queries, shopping list manipulation/queries, inventory information/queries, dispenser operations, unit conversions, or other cooking related questions.

According to an example embodiment, identifying the presence of the conversational state trigger may include determining that the user is interacting with the appliance based at least in part on the image. In this regard, controller 164 may analyze the image or video obtained at step 330 to detect at least one of a user's body position, posture, eye contact, body proximity, or approach angle. For example, if a user is making eye contact with refrigerator appliance 100 while giving the voice input this may be indicative of the intention to trigger the conversational state of operation. Similarly, if the user is walking toward refrigerator appliance 100, is facing the refrigerator appliance 100, or otherwise has a posture indicating the intent to interact with refrigerator appliance 100, this may also signal and intent to trigger the conversational state of operation.

As explained above with respect to method 200, these actions may also be used to adjust an action confidence metric and responsive action may be performed when the action confidence metric falls within a desired range or exceeds a predetermined threshold. It should be appreciated that any suitable image recognition process may be used to analyze the image obtained at step 330, e.g., such as machine learning image recognition, posture analysis, or any other suitable and known technique for analyzing images.

Step 350 may include entering a conversational state of operation, wherein the conversational state of operation analyzes the voice input using a conversational state response criteria. Once the conversational state of operation has been entered, refrigerator appliance 100 is more likely to take responsive action in response to voice inputs. By contrast, if a vague or unclear request has been made by the user, refrigerator appliance 100 may be more likely to seek clarity or request further prompting from the user in response to receiving the voice input.

Step 360 may include determining that a responsive action to the voice input is needed using the conversational state response criteria. In this case, step 370 may include implementing the responsive action included in the voice input. By contrast, method 300 may further include identifying, based at least in part on the voice input and/or the obtained image or video, an absence of the conversational state trigger. When the conversational state trigger is not present, refrigerator appliance 100 may enter the standard state of operation, wherein the standard state of operation analyzes the voice input using a strict response criteria, and wherein the responsive action is less likely to be taken under the strict response criteria relative to the conversational state response criteria. In this regard, for example, method 300 may include determining that the responsive action to the voice input is not needed using the strict response criteria.

Notably, if a predetermined amount of time passes with no interaction from the user while refrigerator appliance 100 is in the conversational state of operation, it may be desirable to exit the conversational state and enter the standard mode of operation. Accordingly, method 300 may further include determining that a predetermined amount of time has passed since obtaining of the voice input and entering a standard state of operation, wherein the standard state of operation analyzes the voice input using a strict response criteria instead of the conversational state response criteria. For example, the predetermined amount of time may be 5 seconds, 10 seconds, 30 seconds, 1 minute, or any other suitable amount of time.

Similar to method 200, step 370 of implementing the responsive action may include at least one of performing an appliance function, providing an informative response to a user, or prompting the user for further information or clarification. In addition, method 300 may include providing a user notification regarding performance of the responsive action, wherein providing the user notification comprises converting a textual response to a verbal response using a text-to-speech algorithm. It should be appreciated that any other communications with the user regarding requested actions and/or performed responsive actions may be used while remaining within the scope of the present subject matter.

FIGS. 3 and 4 depict example control methods having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of these methods are explained using refrigerator appliance 100 as an example, it should be appreciated that these methods may be applied to the operation of any suitable appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of operating an appliance, the appliance comprising a microphone, the method comprising:

obtaining a sound signal using the microphone;

analyzing the sound signal to identify a voice input including a request for a responsive action, wherein analyzing the sound signal to identify the voice input comprises, determining that the sound signal exceeds a predetermined sound level, commencing a recording of the sound signal, determining that the sound signal drops below the predetermined sound level for a predetermined amount of time, stopping the recording of the sound signal, and analyzing the recording of the sound signal to identify the voice input;

determining an action confidence metric regarding performance of the responsive action;

determining that the action confidence metric exceeds a predetermined action threshold;

determining that the responsive action to the voice input is needed based on the action confidence metric exceeding the predetermined action threshold; and performing the responsive action.

2. The method of claim 1, further comprising:

determining that the voice input contains a wake word for the appliance;

increasing the action confidence metric.

3. The method of claim 1, further comprising:

determining that the voice input contains a request to perform a common appliance function; and increasing the action confidence metric.

4. The method of claim 3, wherein the appliance is a refrigerator appliance and the common appliance function is at least one of temperature setting changes/queries, shopping list manipulation/queries, inventory information/queries, dispenser operations, unit conversions, or other cooking related questions.

5. The method of claim 1, further comprising:

determining that the voice input is received while the appliance is in a conversational state of operation; and increasing the action confidence metric.

6. The method of claim 5, further comprising:

exiting the conversational state of operation after a predetermined amount of time has passed since obtaining the sound signal.

7. The method of claim 6, wherein the predetermined amount of time is between 5 and 30 seconds.

8. The method of claim 1, further comprising:

determining that the action confidence metric falls below the predetermined action threshold; and determining that the responsive action to the voice input is not needed based on the action confidence metric falling below the predetermined action threshold.

9. The method of claim 1, wherein the responsive action comprises at least one of performing an appliance function, providing an informative response to a user, or prompting the user for further information or clarification.

10. The method of claim 1, further comprising:

analyzing the voice input using a machine learning model to identify the responsive action.

11. The method of claim 1, wherein analyzing the sound signal to identify the voice input further comprises:

analyzing the recording to determine that a human voice is present in the recording:

generating a textual record of the recording using a speech-to-text algorithm; and analyzing the textual record to determine if the response action is needed from the appliance.

12. The method of claim 11, wherein analyzing the textual record comprises using a machine learning model.

13. The method of claim 1, further comprising:

providing a user notification regarding performance of the responsive action, wherein providing the user notification comprises converting a textual response to a verbal response using a text-to-speech algorithm.

14. An appliance comprising:

a cabinet;

a microphone mounted to the cabinet; and a controller in operative communication with the microphone, the controller being configured to:

obtain a sound signal using the microphone;

analyze the sound signal to identify a voice input including a request for a responsive action, wherein analyzing the sound signal to identify the voice input comprises, determining that the sound signal exceeds a predetermined sound level, commencing a recording of the sound signal, determining that the sound signal drops below the predetermined sound level for a predetermined amount of time, stopping the recording of the sound signal, and analyzing the recording of the sound signal to identify the voice input;

determine an action confidence metric regarding performance of the responsive action;

determine that the action confidence metric exceeds a predetermined action threshold;

determine that the responsive action to the voice input is needed based on the action confidence metric exceeding the predetermined action threshold; and perform the responsive action.

15. The appliance of claim 14, wherein the controller is further configured to:

determine that the voice input contains a wake word for the appliance;

increase the action confidence metric.

16. The appliance of claim 14, wherein the controller is further configured to:

determine that the voice input contains a request to perform a common appliance function; and increase the action confidence metric.

17. The appliance of claim 14, wherein the controller is further configured to:

determine that the voice input is received while the appliance is in a conversational state of operation; and increase the action confidence metric.

18. The appliance of claim 17, wherein the controller is further configured to:

exiting the conversational state of operation after a predetermined amount of time has passed since obtaining the sound signal.

19. The appliance of claim 14, wherein the controller is further configured to:

determine that the action confidence metric falls below the predetermined action threshold; and determine that the responsive action to the voice input is not needed based on the action confidence metric falling below the predetermined action threshold.

* * * * *